(12) United States Patent
Lee et al.

(10) Patent No.: US 10,901,488 B2
(45) Date of Patent: Jan. 26, 2021

(54) DISPLAY DEVICE INCLUDING PLURALITY OF SMALL POWER MODULES

(71) Applicant: SAMSUNG ELECTRONICS CO., LTD., Suwon-si (KR)

(72) Inventors: Jiwon Lee, Suwon-si (KR); Jaeeun Kim, Suwon-si (KR); Sungyong Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/388,368

(22) Filed: Apr. 18, 2019

(65) Prior Publication Data

US 2019/0324522 A1 Oct. 24, 2019

(30) Foreign Application Priority Data

Apr. 18, 2018 (KR) .................. 10-2018-0045068

(51) Int. Cl.
*G06F 1/3234* (2019.01)
*G06F 1/26* (2006.01)
*G06F 1/3296* (2019.01)
*G09G 5/00* (2006.01)

(52) U.S. Cl.
CPC ............ *G06F 1/3265* (2013.01); *G06F 1/263* (2013.01); *G06F 1/3296* (2013.01); *G09G 5/003* (2013.01); *G09G 2330/021* (2013.01)

(58) Field of Classification Search
CPC .......... G06F 1/3265; G06F 1/26; G06F 1/263; G06F 1/3296; G09G 5/003; G09G 2330/021
See application file for complete search history.

(56) References Cited

U.S. PATENT DOCUMENTS

| 8,391,037 B2 | 3/2013 | Jung |
| 9,231,437 B2 | 1/2016 | Choe |
| 9,240,735 B2 | 1/2016 | Choi et al. |

(Continued)

FOREIGN PATENT DOCUMENTS

| KR | 10-0843451 B1 | 7/2008 |
| KR | 10-0871488 B1 | 12/2008 |

(Continued)

OTHER PUBLICATIONS

International Search Report (PCT/ISA/210) and Written Opinion (PCT/ISA/237) dated Aug. 6, 2019 issued by the International Searching Authority in International Application No. PCT/KR2019/004672.

(Continued)

*Primary Examiner* — Priyank J Shah
(74) *Attorney, Agent, or Firm* — Sughrue Mion, PLLC

(57) ABSTRACT

A display device according to an embodiment includes a first power module that receives AC power from an external power supply, a second power module that receives the AC power through the first power module, and a load circuit that outputs a specified signal when a user input is received. A configuration of the display device with the three power modules reduces an inrush current when the display device is turned on. Also, a configuration of the display device with the three power modules reduces a standby power consumption when the display device is not turned on.

20 Claims, 6 Drawing Sheets

(56) References Cited

U.S. PATENT DOCUMENTS

| | | |
|---|---|---|
| 9,444,251 B2 | 9/2016 | Woo et al. |
| 9,893,560 B2 | 2/2018 | Choe |
| 10,217,419 B2 | 2/2019 | Joo et al. |
| 2009/0010671 A1 | 1/2009 | Hashimoto |
| 2010/0306558 A1* | 12/2010 | Kang .................... G06F 1/3296 713/300 |
| 2013/0169612 A1 | 7/2013 | Woo et al. |
| 2014/0204637 A1 | 7/2014 | Choi et al. |
| 2014/0204638 A1 | 7/2014 | Jung |
| 2015/0380982 A1 | 12/2015 | Choe |
| 2017/0309232 A1 | 10/2017 | Joo et al. |

FOREIGN PATENT DOCUMENTS

| | | |
|---|---|---|
| KR | 10-1633297 B1 | 6/2016 |
| KR | 10-2017-0120421 A | 10/2017 |

OTHER PUBLICATIONS

Communication dated Jul. 29, 2019, issued by the European Patent Office in counterpart European Application No. 19170152.3.

* cited by examiner

DISPLAY DEVICE INCLUDING PLURALITY OF SMALL POWER MODULES

CROSS-REFERENCE TO RELATED APPLICATION(S)

This application is claims benefit of priority under 35 U.S.C. § 119 to Korean Patent Application No. 10-2018-0045068, filed on Apr. 18, 2018, in the Korean Intellectual Property Office, the disclosure of which is hereby incorporated by reference.

BACKGROUND

1. Field

Embodiments of the disclosure relate to technology for implementing switching power modules.

2. Description of Related Art

A large display device or a high-brightness display device requires a large capacity power module (e.g., a switching mode power supply (SMPS)) because of its high power consumption. The large capacity power module may be designed by a single large power module. For example, the large capacity power module may be designed to have a rating corresponding to power consumption of a load circuit. Optionally, the large capacity power module may be designed by a combination of a plurality of small power modules. For example, output terminals of the plurality of small power modules are connected in parallel to one another, outputting large power.

In the case of a switching power module, the power module generates a voltage for initializing a display device because the power module needs to perform rectification, digital conversion, and level conversion on AC power even before a turned on state. As described above, each of the plurality of small power modules consumes standby power even before the plurality of small power modules are turned on, resulting in increase in total standby power of the display device.

SUMMARY

Aspects of the disclosure are to address at least the above-mentioned problems and/or disadvantages and to provide at least the advantages described below. Accordingly, an aspect of the disclosure is to provide a display device including a plurality of small power modules formed to reduce standby power.

In accordance with an aspect of the disclosure, a display device includes a first power module that receives AC power from an external power supply, a second power module configured to receive the AC power via the first power module; and a load circuit configured to output a specified signal when a user input is received, wherein the first power module includes a conversion circuit that generates a first voltage for driving the load circuit by performing digital conversion on the the received AC power, a switch configured to be activated when the specified signal is received and output a second voltage based on the first voltage, and a first relay configured to form a path for transferring the received AC power to the second power module according to reception of the first voltage, and wherein the second power module is configured to receive the AC power via the first relay.

In accordance with another aspect of the disclosure, a display device includes a first power module and a second power module each that receive AC power from an external power supply, and a load circuit that outputs a specified signal when a user input is received, wherein the first power module includes a first conversion circuit that generates a first voltage for driving the load circuit by performing digital conversion on the received AC power, and a first switch that is activated when the specified signal is received and output a second voltage based on the first voltage, and wherein the second power module includes a first relay that forms a path for receiving the AC power from the external power supply when the second voltage is supplied, a second conversion circuit that generates, when the AC power is received via the first relay, a third voltage by performing digital conversion on the received AC power, and a second switch that is activated when the third voltage is supplied and output a fourth voltage based on the third voltage.

In some embodiments, a display device is provided. The display device includes a first power module configured to receive AC power from an external power supply; a second power module configured to receive the AC power via the first power module; and a load circuit configured to output a specified signal when a user input is received. In some embodiments, the first power module includes: a first conversion circuit configured to generate a first voltage for driving the load circuit by performing a first digital conversion on the received AC power, a first switch configured to be activated when the specified signal is received and output a first driving signal based on the first voltage, and a first relay configured to, form a path for transferring the received AC power to the second power module. In some embodiments, the second power module is configured to receive the AC power via the first relay.

In some embodiments, the first power module and the second power module are configured to have a same rating.

In some embodiments, the display device includes a display module and the first power module is further configured to generate a second voltage by performing a second digital conversion on an output of the first conversion circuit when the specified signal is received, and the second power module is further configured to generate, when the AC power is received via the first relay, a third voltage by performing a third digital conversion on the received AC power, and the second voltage is configured to be used as a first driving voltage for the display module and the third voltage is configured to be used as a second driving voltage for the display module.

In some embodiments, the display device includes a processor configured to be initialized when the specified signal is received, and to control the display module.

In some embodiments of the display device, the first power module includes: a first interface configured to receive the AC power from the external power supply and a second interface electrically connected to the external power supply and a first terminal of the first relay, and a third interface electrically connected to a second terminal of the first relay. In some embodiments, the first power module is further configured to transfer the AC power, received through the second interface to the third interface via the first relay.

In some embodiments of the display device, the second power module includes a second conversion circuit configured to generate, when the AC power is received via the first relay, a fourth voltage by performing a fourth digital conversion on the received AC power. In some embodiments the second power module also includes a second switch configured to be activated when the fourth voltage is supplied and to output a second driving signal based on the fourth voltage and a second relay configured to form a path for transferring the AC power received via the first relay when the second relay is activated based on a reception of the second driving signal.

In some embodiments of the display device, the second power module includes a fourth interface connected to the first relay of the first power module; a fifth interface connected in parallel to an interface of the first power module to which the AC power is input, wherein the fifth interface is electrically connected to the external power supply and a first terminal of the second relay; and a sixth interface electrically connected to a second terminal of the second relay. In some embodiments, the second power module is further configured to transfer the AC power, received from the external power supply through the fifth interface to the sixth interface via the second relay.

Some embodiments of the display device include a third power module configured to receive the AC power via the second relay.

In some embodiments of the display device, the third power module includes: a third conversion circuit configured to generate, when the AC power is received via the second relay, a fifth voltage by performing a fifth digital conversion on the received AC power; a third switch configured to be activated when the fifth voltage is supplied and to output a third driving signal based on the fifth voltage; and a third relay configured to form a path for transferring the AC power, received via the second relay, to another power module when the third relay is activated based on a reception of the third driving signal.

Also provided is a display device including a first power module configured to receive AC power from an external power supply; a second power module configured to receive the AC power from the external power supply; and a load circuit configured to output a specified signal when a user input is received. In some embodiments, the first power module includes a first conversion circuit configured to generate a first voltage for driving the load circuit by performing a first digital conversion on the received AC power, and a first switch configured to be activated when the specified signal is received and to output a first driving signal based on the first voltage. In some embodiments, the second power module includes: a first relay configured to form a first path for receiving the AC power from the external power supply when the first driving signal is supplied, a second conversion circuit configured to generate, when the AC power is received via the first relay, a second voltage by performing a second digital conversion on the received AC power, and a second switch configured to be activated when the second voltage is supplied and to output a second driving signal based on the second voltage.

In some embodiments of the display device, as mentioned above, the first power module and the second power module are configured to have a same rating.

In some embodiments of the display device, as mentioned above, the display device includes a display module, the first power module is further configured to generate a third voltage by performing a third digital conversion on an output of the first conversion circuit when the specified signal is received. Also, the second power module is further configured to generate, when the AC power is received via the first relay, a fourth voltage by performing a fourth digital conversion on the received AC power. In addition, the third voltage is configured to be used as a driving voltage for the display module and the fourth voltage is configured to be used as a driving voltage for the display module.

In some embodiments of the display device, the display device includes a processor configured to be initialized when the specified signal is received, and to control the display module.

In some embodiments of the display device, a first input terminal of the first power module and a second input terminal of the second power module are connected in parallel to each other, and the first power module includes a first interface to receive a first external power and the second power module includes a second interface configured to receive a second external power.

In some embodiments of the display device, the display device includes a third power module, and the third power module includes: a second relay configured to form a second path configured to receive AC power from the external power supply when the second driving signal is supplied to the second relay; a third conversion circuit configured to generate, when the AC power is received via the second relay, a fifth voltage by performing a fifth digital conversion on the received AC power; and a switch configured to: i) be activated when the fifth voltage is supplied and ii) output a third driving signal based on the fifth voltage.

In an alternative embodiment, a display device is provided including: a first power module, configured to be coupled to an external power source, wherein the first power module comprises a first converter; a second power module coupled to the first power module, wherein the first power module comprises a second converter; a third power module coupled to the second power module, wherein the third power module comprises a third converter; and a display module. In the alternative embodiment, a first interface of the display module is configured to receive a first voltage from the first converter, a second interface of the display module is configured to receive a second voltage from the second converter, and a third interface of the display is configured to receive a third voltage from the third converter.

In some embodiments of the alternative embodiment, the first power module is configured to deliver the first voltage to the display module earlier in time than the second power module is configured to deliver the second voltage to the display module.

In some embodiments of the alternative embodiment, the second power module is configured to deliver the second voltage to the display module earlier in time than the third power module is configured to deliver the third voltage to the display module.

In some embodiments of the alternative embodiment, a delivery of the first voltage to the display module earlier in time than the second voltage is configured to reduce an inrush current when the display device is turned on.

In some embodiments of the alternative embodiment, a delivery of a standby voltage to the display module and a lack of a delivery of the second voltage to the display module is configured to reduce a standby power consumption of the display device when the display device is not turned on.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of drawings, similar components may be marked by similar reference numerals.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1A:
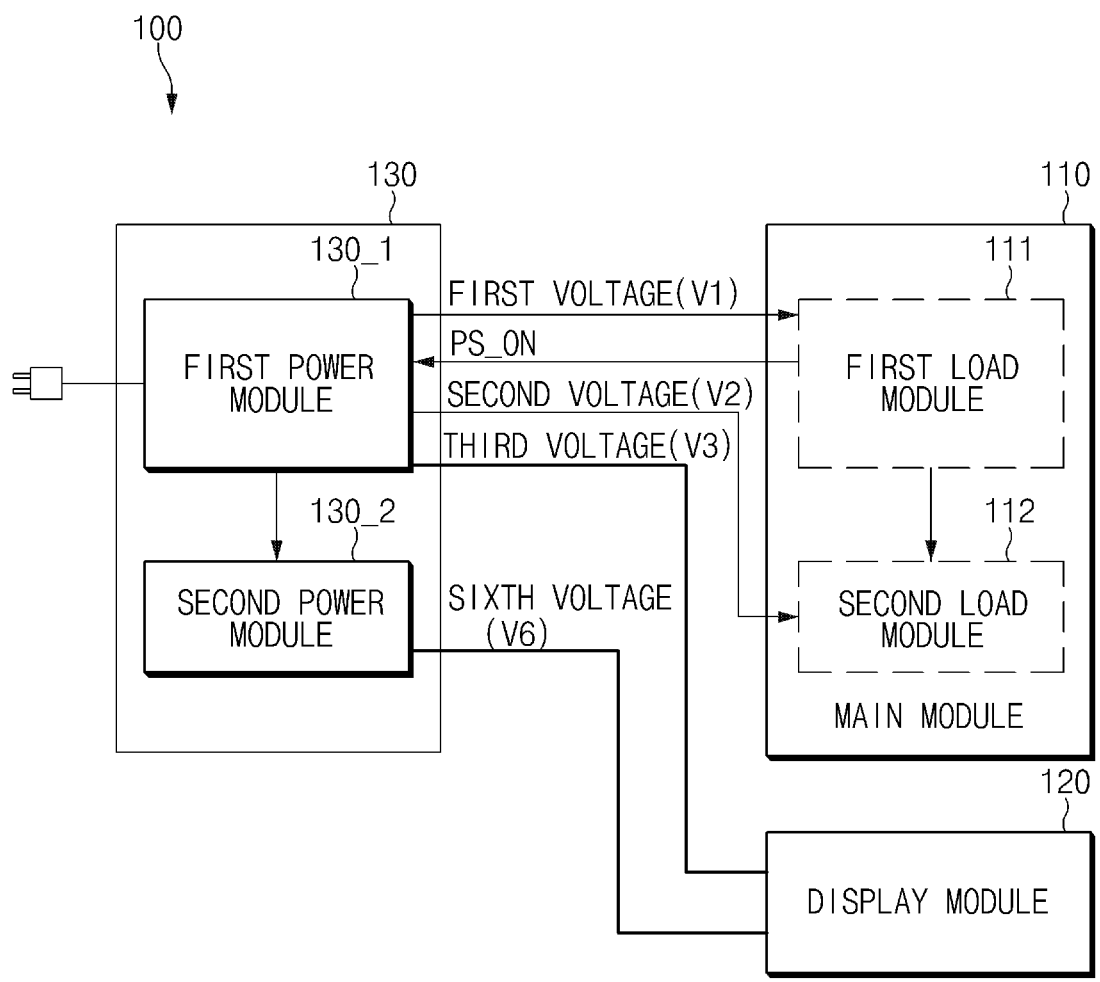
FIG. 1A is an example of a configuration diagram of a display device according to an embodiment.

FIG. 1A is an example of a configuration diagram of a display device according to an embodiment.

Referring to FIG. 1A, a display device 100 may include a main module 110, a display module 120, and a plurality of power modules 130. According to an embodiment, the display module 120, the main module 110, a first power module 130_1, and a second power module 130_2 may be formed on different printed circuit boards respectively and may be connected to one another through connection means, such as a connector or a wire.

According to an embodiment, the main module 110 may be driven using at least one (e.g., a first voltage signal) of a first voltage and a second voltage output from at least one (e.g., the first power module 130_1) of the plurality of power modules 130. The main module 110 may include a first load circuit 111, a second load circuit 112, and the like.

The first load circuit 111 may output a first specified signal (a signal of a standby state in which reception of a signal PS_ON is waited for in a state where the display module 120 is turned off) before a user input is received. When the first load circuit 111 receives a user input (a PS_ON request signal), the first load circuit 111 may output a second specified signal PS_ON. The user input may be an input for powering on, for example, the display device 100. The first specified signal may be, for example, a low level signal and the second specified signal may be, for example, a high level signal. The first load circuit 111 may include at least one of a communication circuit that receives a user input from, for example, a remote control device, an input button that receives a user input, and a block that is needed to initialize a processor. The first load circuit 111 may be driven using the first voltage.

The second load circuit 112 may include a processor (e.g., GPU) initialized when the second specified signal is received. The processor may control image output of the display module 120. The second load circuit 112 may be driven using the second voltage.

According to an embodiment, the display module 120 may be driven using a voltage provided from the plurality of power modules 130 (e.g., a third voltage and a sixth voltage). As used herein, a drive voltage includes an electrical waveform used as an input to a circuit. The waveform may be a power delivering signal. The display module 120 may include at least one display. The display may display, for example, a variety of content (e.g., text, images, videos, icons, and/or symbols). The display may include, for example, a liquid crystal display (LCD), a light emitting diode (LED) display, an organic light emitting diode (OLED) display, or an electronic paper display.

According to an embodiment, the plurality of power modules 130 may include, for example, the first power module 130_1 and the second power module 130_2. The first power module 130_1 and the second power module 130_2 may be switching power modules (e.g., a switching module power supply (SMPS)) and be provided to have the same rating (e.g., a rated voltage or a rated current).

According to an embodiment, the first power module 130_1 may receive AC power from an external power supply and generate a first voltage (a first voltage signal), a second voltage (a second voltage signal), and a third voltage (a third voltage signal) by using the received AC power (e.g., digital conversion). For example, when the first power module 130_1 receives the first specified signal from the first load circuit 111, the first power module 130_1 may generate the first voltage and, when the first power module 130_1 receives the second specified signal, the first power module 130_1 may generate the first voltage, the second voltage, and the third voltage. The first power module 130_1 may include a relay and output received power via the relay. For example, the relay may be activated when the first voltage or the second voltage is received, and output the AC power input to the first power module 130_1. As used herein, activation of a relay may also be referred to as short-circuiting the relay. The first voltage may be supplied to the first load circuit 111, the second voltage may be supplied to the second load circuit 112, and the third voltage may be supplied to the display module 120.

The second power module 130_2 may receive the AC power via the first power module 130_1 and, when the AC power is received from the first power module 130_1, generate a fourth voltage (a fourth voltage signal), a fifth voltage (a fifth voltage signal), and a sixth voltage (a sixth voltage signal). The second power module 130_2 may include a relay and output the received AC power via the relay. For example, when the fourth voltage or the fifth voltage is supplied, the relay may output the received AC power. The third voltage of the first power module 130_1 and the sixth voltage of the second power module 130_2 may be connected in parallel to each other (load share) and may be transferred to the display module 120. According to various embodiments, three or more power modules may be included in the plurality of power modules 130 to provide for power consumption of the display device 100.

According to the above-described embodiment, it is possible to reduce possibility of occurrence of AC inrush current at the time of initialization of the display device 100 because the plurality of power modules are sequentially activated. As used herein, "AC" may refer to a time-varying waveform and "DC" may refer to waveform that, when is not zero, represents a constant value. A DC waveform may, however, have a starting time and an ending time. In addition, the display device 100 may be driven using output power of the plurality of power modules, and, in a standby state, only one of the plurality of power modules is driven, thereby reducing standby power.

Figure 1B:
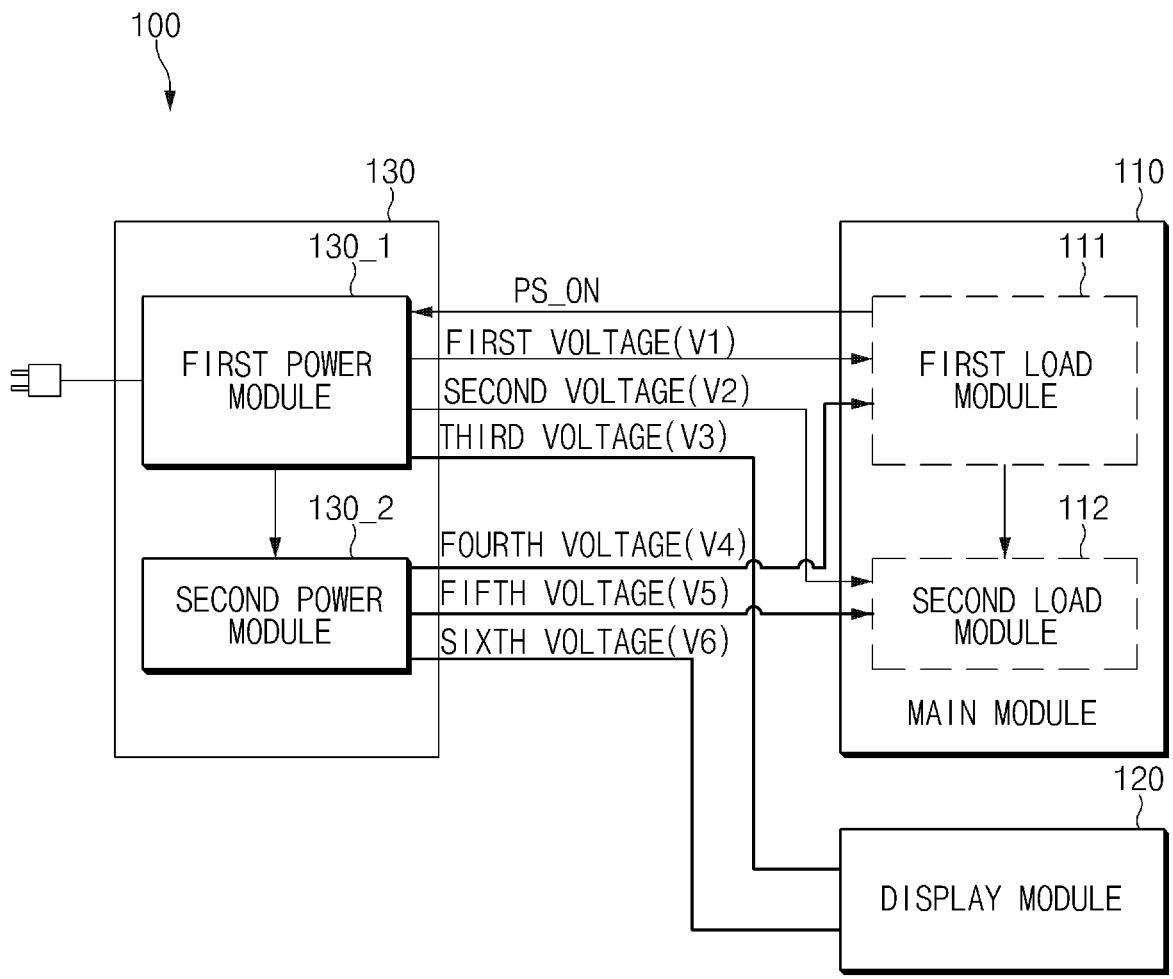
FIG. 1B is another example of a configuration diagram of a display device according to an embodiment.

FIG. 1B is another example of a configuration diagram of a display device according to an embodiment.

Referring to FIG. 1B, according to an embodiment, the display device 100 may include the main module 110, the display module 120, and the plurality of power modules 130. FIG. 1B is substantially identical to FIG. 1A, except that the main module 110 further uses an output voltage (a fourth voltage and a fifth voltage) of the second power module 130_2, and therefore, description will be given with respect to the difference.

According to an embodiment, the plurality of power modules 130 may include the first power module 130_1 and the second power module 130_2. The first power module 130_1 may output a first voltage V1, a second voltage V2, and a third voltage V3. The second power module 130_2 may output a fourth voltage V4, a fifth voltage V5, and a sixth voltage V6.

According to an embodiment, the main module 110 may be driven using the first voltage V1, the second voltage V2, the fourth voltage V4, and the fifth voltage V5 output from the first power module 130_1 and the second power module 130_2. For example, the first load circuit 111 of the main module 110 may be driven using the first voltage and the fourth voltage. The second load circuit 112 of the main module 110 may be driven using the second voltage and the fifth voltage.

According to an embodiment, the display module 120 may be driven using the third voltage and the sixth voltage provided by the plurality of power modules 130.

Figure 2:
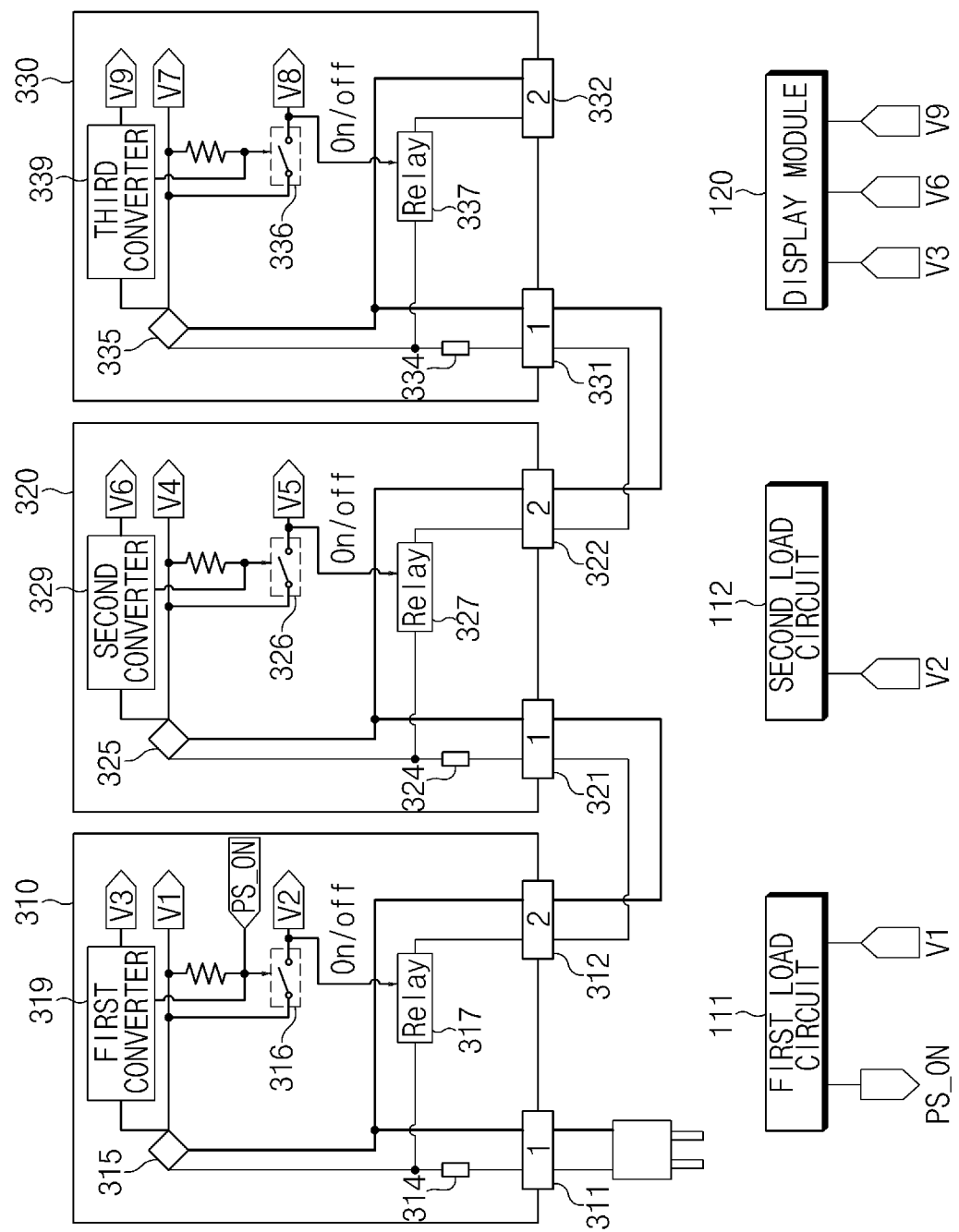
FIG. 2 illustrates an example of a plurality of power modules connected in series to an external power supply according to an embodiment.

FIG. 2 illustrates an example of a plurality of power modules connected in series to an external power supply according to an embodiment.

Referring to FIG. 2, a plurality of power modules 310, 320, and 330 (e.g., 130 of FIG. 1A) may include the first power module 310, the second power module 320, and the third power module 330.

According to an embodiment, the first power module 310 may include a first interface 311 (or a first AC circuit), a conversion circuit 315, a switch 316, a relay 317, a second interface 312 (or a second AC circuit), and a first converter 319. Each of the AC circuits (e.g., the first AC circuit) may include a connector capable of receiving AC power from an external power supply, for example. As used herein, supply of AC power from an external power supply includes the imposition of a voltage by the external power supply to a node of a circuit and a sinking of a plurality of currents by circuits connected to the node. The AC power may refer to any combination of the voltage and one or more of the currents. When a first specified signal is received, the first power module 310 may generate only a first voltage signal V1. On the other hand, when a second specified signal is received, the first power module 310 may generate a first voltage V1, a second voltage V2, and a third voltage V3.

When the first interface 311 is connected to the external power supply, the first interface 311 may receive the AC power from the external power supply. The received AC power may be transferred to the conversion circuit 315 via an AC fuse 314. The AC fuse 314 may be a fuse connected in series to, for example, an input terminal of the AC power.

The conversion circuit 315 may receive the AC power from the external power supply via the AC fuse 314, and generate the first voltage V1 (DC voltage), the second voltage V2 (DC voltage), and the third voltage V3 (DC voltage) using the received AC power (e.g., digital conversion). The conversion circuit 315 may include, for example, a switching power conversion circuit. As used herein, digital conversion includes producing a specific DC output voltage from either an input DC source or an input AC source using logical control of switching elements.

A first terminal of the switch 316 may be connected to the first voltage, a second terminal of the switch 316 may be connected to a control terminal of the relay 317, and a control terminal of the switch 316 may be connected to a first load circuit (e.g., 111 of FIG. 1A). When the first specified signal from the first load circuit 111 is received in the control terminal of the switch 316, the first terminal of the switch 316 and the second terminal of the switch 316 may be opened. When the second specified signal (e.g., a high level signal) from the first load circuit (e.g., 111 of FIG. 1A) is received in the control terminal of the switch 316, the first terminal of the switch 316 and the second terminal of the switch 316 may be activated. As used herein, "activating a switch" means closing a switch and "activating a relay" includes connecting the output of the relay to the input of the relay by action of a third signal applied to a coil of the relay. When the first terminal of the switch 316 and the second terminal of the switch 316 are activated, the switch 316 may output the first voltage. In the disclosure, for convenience of description, the first voltage passed through the switch 316 is referred to as the second voltage.

When the second voltage (a first driving signal) is received from the switch 316, the relay 317 may form a path for transferring power received by the first interface 311 to the second interface 312. For example, the relay 317 may include a coil and a switch. When a current (the first driving signal) corresponding to the second voltage is applied to the coil of the relay 317, the switch of the relay 317 is activated, allowing the power received by the first interface 311 to be transferred to the second interface 312.

The second interface 312 may receive AC power, received through the first interface 311, via the relay 317, and supply the received AC power to the second power module 320. The second interface 312 may be connected in series to a first interface 321 of the second power module 320 through at least one of a connector and a wire.

The first converter 319 may receive an output voltage (the first voltage) of the conversion circuit 315 and convert (e.g., boost) the first voltage to a specified level to output the third voltage. The first converter 319 is an example of a conversion circuit acting on an input DC voltage to produce a specified output DC voltage. For example, when the first converter 319 receives the second specified signal of a high level, the first converter 319 may be activated and may generate the third voltage by converting the first voltage to a specified level. The third voltage may be supplied to a display module (e.g., 120 of FIG. 1A). On the other hand, when the first converter 319 receives the first specified signal of a low level, the first converter 319 may be deactivated.

According to an embodiment, the second power module 320 may include the first interface 321, a conversion circuit 325, a switch 326, a relay 327, a second interface 322, and a second converter 329. When the AC power is not received from the first power module 310, the second power module 320 may be deactivated and, when the AC power is received, be activated and generate the fourth voltage V4, the fifth voltage V5, and the sixth voltage V6.

The first interface 321 may receive the AC power from the external power supply through the first power module 310. The received AC power may be supplied to the conversion circuit 325 via an AC fuse 324.

The conversion circuit 325 may be supplied with the AC power received through the first interface 321 via the AC fuse 324, and generate the fourth voltage V4 (DC voltage), the fifth voltage V5 (DC voltage), and the sixth voltage (DC voltage) using the supplied AC power (e.g., digital conversion). The conversion circuit 325 may include, for example, a switching power conversion circuit.

A first terminal of the switch 326 may be connected to the fourth voltage, a second terminal of the switch 326 may be connected to a control terminal of the relay 327, and a control terminal of the switch 326 may be pulled up by the fourth voltage. When the fourth voltage is supplied, the first terminal of the switch 326 and the second terminal of the switch 326 may be activated. When the switch 326 is activated, the switch 326 may output the fourth voltage. In the disclosure, for convenience of description, the fourth voltage passed through the switch 326 is referred to as the fifth voltage.

When the relay 327 receives the fifth voltage V5 from the switch 326, the relay 327 may form a path for transferring the AC power received by the first interface 321 to the second interface 322. For example, the relay 327 may include a coil and a switch. When a current (a second driving signal) corresponding to the fifth voltage to the coil of the relay 327, the switch of the relay 327 may be activated to transfer the AC power received by the first interface 321 to the second interface 322.

The second interface 322 may receive the AC power, received through the first interface 321, via the relay 327, and supply the received AC power to the third power module 330. The second interface 322 may be connected in series to a first interface 331 through at least one of a connector or a wire.

The second converter 329 may receive an output voltage (the fourth voltage) of the conversion circuit 325 and output the sixth voltage by converting (e.g., boosting) the fourth voltage to a specified level. The second converter 329 is an example of a conversion circuit acting on an input DC voltage to produce a specified output DC voltage. The second converter 329 may be activated or deactivated by the fourth voltage. When the fourth voltage is applied to a control terminal of the second converter 329, the second converter 329 may be activated and generate the sixth voltage by converting the fourth voltage to a specified level. The sixth voltage may be supplied to a display module (e.g., 120 of FIG. 1A). On the other hand, when the fourth voltage is not applied to the control terminal of the second converter 329, the second converter 329 may be deactivated.

According to an embodiment, the third power module 330 may include a first interface 331, a conversion circuit 335, a switch 336, a relay 337, a second interface 332, and a third converter 339. When AC power is not received from the second power module 320, the third power module 330 may be deactivated and, when the AC power is received, be activated and generate a seventh voltage V7 (a seventh voltage signal), an eighth voltage V8 (an eighth voltage signal), and a ninth voltage V9 (a ninth voltage signal).

The first interface 331 may receive the AC power from an external power supply through the second power module 320. The received AC power may be transferred to the conversion circuit 335 via an AC fuse 334.

The conversion circuit 335 may be supplied with the AC power received through the first interface 331 via the AC fuse 334, and may generate the seventh voltage V7 (DC voltage), the eighth voltage V8, and the ninth voltage V9 (DC voltage) using the supplied AC power (e.g., digital conversion). The conversion circuit 335 may include, for example, a switching power conversion circuit.

A first terminal of the switch 336 may be connected to the seventh voltage, a second terminal of the switch 336 may be connected to a control terminal of the relay 337, and a control terminal of the switch 336 may be pulled up by the seventh voltage V7. When the seventh voltage V7 is supplied, the first terminal of the switch 336 and the second terminal of the switch 336 may be activated. When the switch 336 is activated, the switch 336 may output the seventh voltage. In the disclosure, for convenience of description, the seventh voltage passed through the switch 336 is referred to as the eighth voltage.

When the relay 337 receives the eighth voltage V8 from the switch 336, the relay 337 may form a path for transferring the AC power received from the first interface 331 to the second interface 332. For example, the relay 337 may include a coil and a switch. When a current (a third driving signal) corresponding to the eighth voltage is applied to the coil of the relay 337, the switch of the relay 337 may be activated and transfer the AC power received from the first interface 331 to the second interface 332.

The second interface 332 may receive the AC power, received through the first interface 331, via the relay 337, and supply the received AC power to another power module (not illustrated) connected to the second interface 332.

The third converter 339 may receive an output voltage (the seventh voltage) of the conversion circuit 335 and output the ninth voltage by converting (e.g., boosting) the seventh voltage to a specified level. The third converter 339 is an example of a conversion circuit acting on an input DC voltage to produce a specified output DC voltage. The third converter 339 may be activated or deactivated by the seventh voltage. When the seventh voltage is applied to the control terminal of the third converter 339, the third converter 339 may be activated and generate the ninth voltage by converting the seventh voltage to a specified level. The ninth voltage may be supplied to a display module (e.g., 120 of FIG. 1A). On the other hand, when the seventh voltage is not applied to the control terminal of the third converter 339, the third converter 339 may be deactivated.

According to the above-described embodiments, only the first voltage of the first power module 310 of the plurality of power modules may be output before initialization of the display device 100 (when the first specified signal is received), and the remaining power modules (e.g., 320 and 330) may be powered off, thereby resolving a problem that standby power increases because all the plurality of power modules consume standby power in a standby state.

Figure 3:
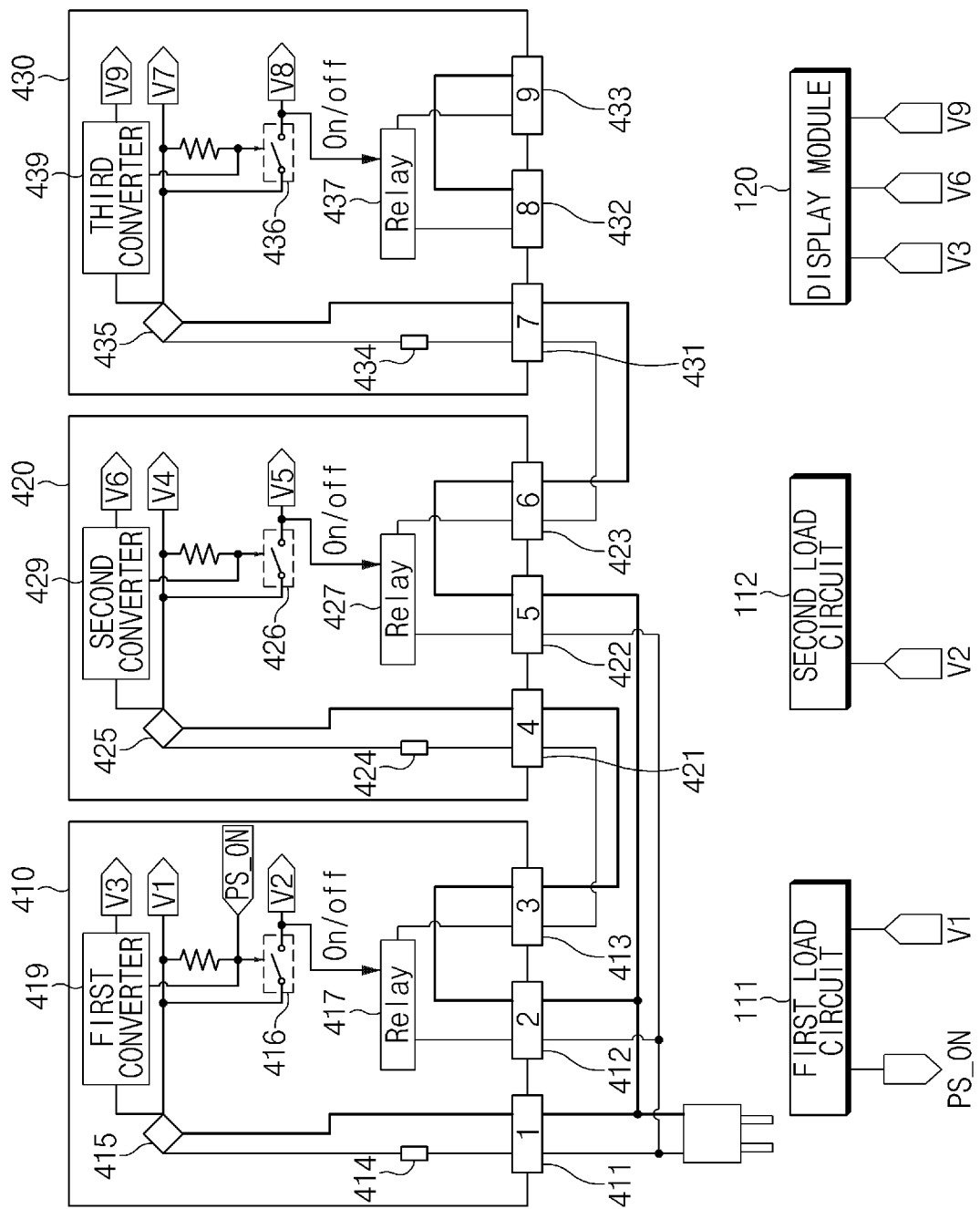
FIG. 3 illustrates an example of a plurality of power modules connected in parallel to an external power supply according to an embodiment.

FIG. 3 illustrates an example of a plurality of power modules connected in parallel to an external power supply according to an embodiment. As used herein, the expression "parallel" neglects the effects of non-ideal interface components and relays affecting voltages more distant from an external power supply.

Referring to FIG. 3, a plurality of power modules 410, 420, and 430 may include the first power module 410, the second power module 420, and the third power module 430. According to an embodiment, some components may be omitted or additional components may be further included. According to an embodiment, some of components may be combined into one object, and functions of the components before combination may be performed in the same way.

According to an embodiment, the first power module 410 may include a first interface 411 (or a first AC circuit), a second interface 412 (or a second AC circuit), a third interface 413 (or a third AC circuit), a first conversion circuit 415, a first switch 416, a first relay 417, and a first converter 419. Each of the AC circuits may include a connector capable of receiving AC power from, for example, an external power supply. When a first specified signal is received, the first power module 410 may generate a first voltage and, when a second specified signal is received, generate the first voltage V1, a second voltage V2, and a third voltage V3. The first voltage V1 may be supplied to a first load circuit (e.g., 111 of FIG. 1A), the second voltage V2 may be supplied to a second load circuit (e.g., 112 of FIG. 1A), and the third voltage V3 may be supplied to a display module (e.g., 120 of FIG. 1A).

The first interface 411 may receive AC power from an external power supply. The first interface 411 may be connected to an input terminal of the first conversion circuit 415 via an AC fuse 414. The AC fuse 414 may be a fuse connected in series to, for example, an input terminal of the AC power.

The second interface 412 may receive the AC power from the external power supply. The second interface 412 may be connected to the external power supply and a first terminal of the first relay 417. The first interface 411 and the second interface 412 may be connected in parallel to each other through connection means, such as a wire or a connector.

The third interface 413 may be connected to a second terminal of the first relay 417. When the first relay 417 is activated, the third interface 413 may output the AC power from the external power supply, which has been received through the second interface 412. The third interface 413 may be connected in series to a fourth interface 421.

The first conversion circuit 415 may receive the AC power, received through the first interface 411, via the AC fuse 414 and generate the first voltage V1 (DC voltage), the second voltage V2 (DC voltage), and the third voltage V3 (DC voltage using the received AC power (e.g., digital conversion). The first conversion circuit 415 may include a switching mode power supply (SMPS).

A first terminal of the first switch 416 may be connected to the first voltage, a second terminal of the first switch 416 may be connected to a control terminal of the first relay 417, and a control terminal of the first switch 416 may be connected to a first load circuit (e.g., 111 of FIG. 1A). When a second specified signal is received in the control terminal of the first switch 416, a path for applying a current to the first relay 417 may be formed. For example, the control terminal of the first switch 416 is in a low state when a first specified signal of a low level is received, and is in a high state when the second specified signal of a high level is received. When the control terminal of the first switch 416 is in a low state, the first terminal of the first switch 416 and the second terminal of the first switch 416 may be opened, and when the control terminal of the first switch 416 is in a high state, the first terminal of the first switch 416 and the second terminal of the first switch 416 may be activated. When the second specified signal is received in the control terminal of the first switch 416, the first switch 416 may output the first voltage. In the disclosure, for convenience of description, the first voltage output via the first switch 416 is referred to as the second voltage.

When a current (a first driving signal) corresponding to the second voltage is applied to the control terminal of the first relay 417, the first relay 417 may form a path for transferring power received through the second interface 412. For example, the first relay 417 may include a coil and a switch. When the second voltage is supplied to the coil of the first relay 417, a first terminal and a second terminal of the switch of the first relay 417 may be activated. In this case, the first relay 417 may transfer the AC power received through the second interface 412 to the third interface 413.

The first converter 419 may receive an output voltage (the first voltage) of the conversion circuit 415 and output the third voltage by converting (e.g., boosting) the first voltage to a specified level. The first converter 419 is an example of a conversion circuit acting on an input DC voltage to produce a specified output DC voltage. For example, when the second specified signal of a high level is received in a control terminal of the first converter 419, the first converter 419 may be activated and generate the third voltage by converting the first voltage to a specified level. The third voltage may be supplied to a display module (e.g., 120 of FIG. 1A). On the other hand, when the first specified signal of a low level is received in the control terminal of the first converter 419, the first converter 419 may be deactivated.

According to an embodiment, the second power module 420 may include the fourth interface 421 (or a fourth AC circuit), a fifth interface 422 (or a fifth AC circuit), a sixth interface 423 (or a sixth AC circuit), a second conversion circuit 425, a second switch 426, a second relay 427, and a second converter 429. When AC power is not received through the first power module 410, the second power module 420 may be deactivated. When the AC power is received, the second power module 420 may be activated and generate a fourth voltage V4, a fifth voltage V5, and a sixth voltage V6.

The fourth interface 421 may be connected in series to the third interface 413 of the first power module 410. The fourth interface 421 may receive the AC power from an external power supply via the second interface 412, the first relay 417, and the third interface 413. The fourth interface 421 may be electrically connected to an input terminal of the second conversion circuit 425 via an AC fuse 424.

The fifth interface 422 may receive the AC power from the external power supply. The fifth interface 422 may be electrically connected to the external power supply and a first terminal of the second relay 427. The fifth interface 422 may be connected in parallel to the first interface 411 and the second interface 412.

The sixth interface 423 may be connected to a second terminal of the second relay 427 and a seventh interface 431. When the second relay 427 is activated, the sixth interface 423 may output the power from the external power supply. The sixth interface 423 may be connected in series to the seventh interface 431 through connection means, such as a wire or a connector.

The second conversion circuit 425 may receive the power, received through the fourth interface 421, via the AC fuse 424 and generate the fourth voltage V4 (DC voltage), the fifth voltage V5 (DC voltage), and the sixth voltage V6 (DC voltage) using the received power (e.g., digital conversion). The second conversion circuit 425 may include a switching mode power supply (SMPS).

A first terminal of the second switch 426 may be connected to the fourth voltage, a second terminal of the second switch 426 may be connected to a control terminal of the second relay 427, and a control terminal of the second switch 426 may be pulled up by the fourth voltage. When the fourth voltage V4 is supplied, a signal of a high level is applied to the control terminal of the second switch 426 and therefore, the first terminal of the second switch 426 and the second terminal of the second switch 426 may be activated. In this case, the second switch 426 may output the fourth voltage V4. In the disclosure, for convenience of description, the fourth voltage output via the second switch 426 is referred to as the fifth voltage.

When a current corresponding to the fifth voltage (a second driving signal) is applied to the control terminal of the second relay 427, the second relay 427 may form a path for transferring the AC power received through the fifth interface 422. For example, the second relay 427 may include a coil and a switch. When the fifth voltage is supplied to the coil of the second relay 427, a first terminal and a second terminal of the switch of the second relay 427 may be activated. In this case, the second relay 427 may transfer the AC power received through the fifth interface 422 to the sixth interface 423.

The second converter 429 may receive an output voltage (the fourth voltage) of the conversion circuit 425 and output the sixth voltage by converting (boosting) the fourth voltage to a specified level. The second converter 429 is an example of a conversion circuit acting on an input DC voltage to produce a specified output DC voltage. The second converter 429 may be activated or deactivated by the fourth voltage. When the fourth voltage is applied to the control terminal of the second converter 429, the second converter 429 may be activated and generate the sixth voltage by converting the fourth voltage to a specified level. The sixth voltage may be supplied to a display module (e.g., 120 of FIG. 1A). On the other hand, when the fourth voltage is not applied to the control terminal of the second converter 429, the second converter 429 may be deactivated.

According to an embodiment, the third power module 430 may include the seventh interface 431 (or a seventh AC circuit), an eighth interface 432 (or an eighth AC circuit), a ninth interface 433 (or a ninth AC circuit), a third conversion circuit 435, a third switch 436, a third relay 437, and a third converter 439. When AC power is not received through the second power module 420, the third power module 430 may be deactivated. When the AC power is received, the third power module 430 may be activated and generate the seventh voltage V7, the eighth voltage V8, and the ninth voltage V9.

The seventh interface 431 may be electrically connected to the sixth interface 423 of the second power module 420. The seventh interface 431 may receive the AC power from an external power supply via the fifth interface 422, the second relay 427, and the sixth interface 423. The seventh interface 431 may be electrically connected to an input terminal of the third conversion circuit 435 via an AC fuse 434. The seventh interface 431 may be connected in parallel to the first interface 411 and the fourth interface 421.

The eighth interface 432 may be electrically connected to a first terminal of the third relay 437. When the eighth interface 432 is connected to the external power supply, the eighth interface 432 may supply the AC power, received from the external power supply, to the ninth interface 433 and another power module (not illustrated) via the third relay 437. It is noted that a case in which the eighth interface 432 is not connected to the external power supply is illustrated as an example in FIG. 3.

The ninth interface 433 may be electrically connected to a second terminal of the third relay 437. In a case in which the eighth interface 432 is connected to the external power supply, when the third relay 437 is activated, the ninth interface 433 may output the power from the external power supply.

The third conversion circuit 435 may receive the AC power, received through the seventh interface 431, via the AC fuse 434 and generate the seventh voltage V7 (DC voltage), the eighth voltage V8 (DC voltage), and the ninth voltage V9 (DC voltage) using the received AC power (e.g., digital conversion). The third conversion circuit 435 may include a switching mode power supply (SMPS).

A first terminal of the third switch 436 may receive the seventh voltage, a second terminal of the third switch 436 may be connected to a control terminal of the third relay 437, and a control terminal of the third switch 436 may be pulled up by the seventh voltage V7. When the seventh voltage is supplied, a signal of a high level is applied to the control terminal of the third switch 436 and therefore, the first terminal of the third switch 436 and the second terminal of the third switch 436 may be activated. In this case, the third switch 436 may output the seventh voltage V7. In the disclosure, for convenience of description, the seventh voltage passed through the third switch 436 is referred to as the eighth voltage.

When a current (a third driving signal) corresponding to the eighth voltage is applied to the control terminal of the third relay 437, the third relay 437 may form a path for transferring power received through the eighth interface 432. For example, the third relay 437 may include a coil and a switch. When a current corresponding to the seventh voltage is applied to the coil of the third relay 437, a first terminal and a second terminal of the switch of the third relay 437 are activated, and when AC power is received through the eighth interface 432, the third relay 437 may transfer the AC power received through the eighth interface 432 to the ninth interface 433.

The third converter 439 may receive an output voltage (the seventh voltage) of the conversion circuit 435 and output the ninth voltage by converting (e.g., boosting) the seventh voltage to a specified level. The third converter 439 is an example of a conversion circuit acting on an input DC voltage to produce a specified output DC voltage. The third converter 439 may be activated or deactivated by the seventh voltage. When the seventh voltage is applied to the control terminal of the third converter 439, the third converter 439 may be activated and generate the ninth voltage by converting the seventh voltage to a specified level. The ninth voltage may be supplied to a display module (e.g., 120 of FIG. 1A). On the other hand, when the seventh voltage is not applied to the control terminal of the third converter 439, the third converter 439 may be deactivated.

According to the above-described embodiments, the plurality of power modules 410, 420 and 430 may be configured by the same printed circuit board and the same component, and may be implemented as a large capacity power module depending on types of connection with the main module (e.g., 110 of FIG. 1A). Input terminals of the plurality of power modules 410, 420 and 430 (e.g., the first interface 411, the fourth interface 421, and the seventh interface 431) may be connected in parallel to one another and each may receive the AC power from the external power supply, thereby preventing overload to the input terminals of the plurality of power modules 410, 420, and 430.

Figure 4:
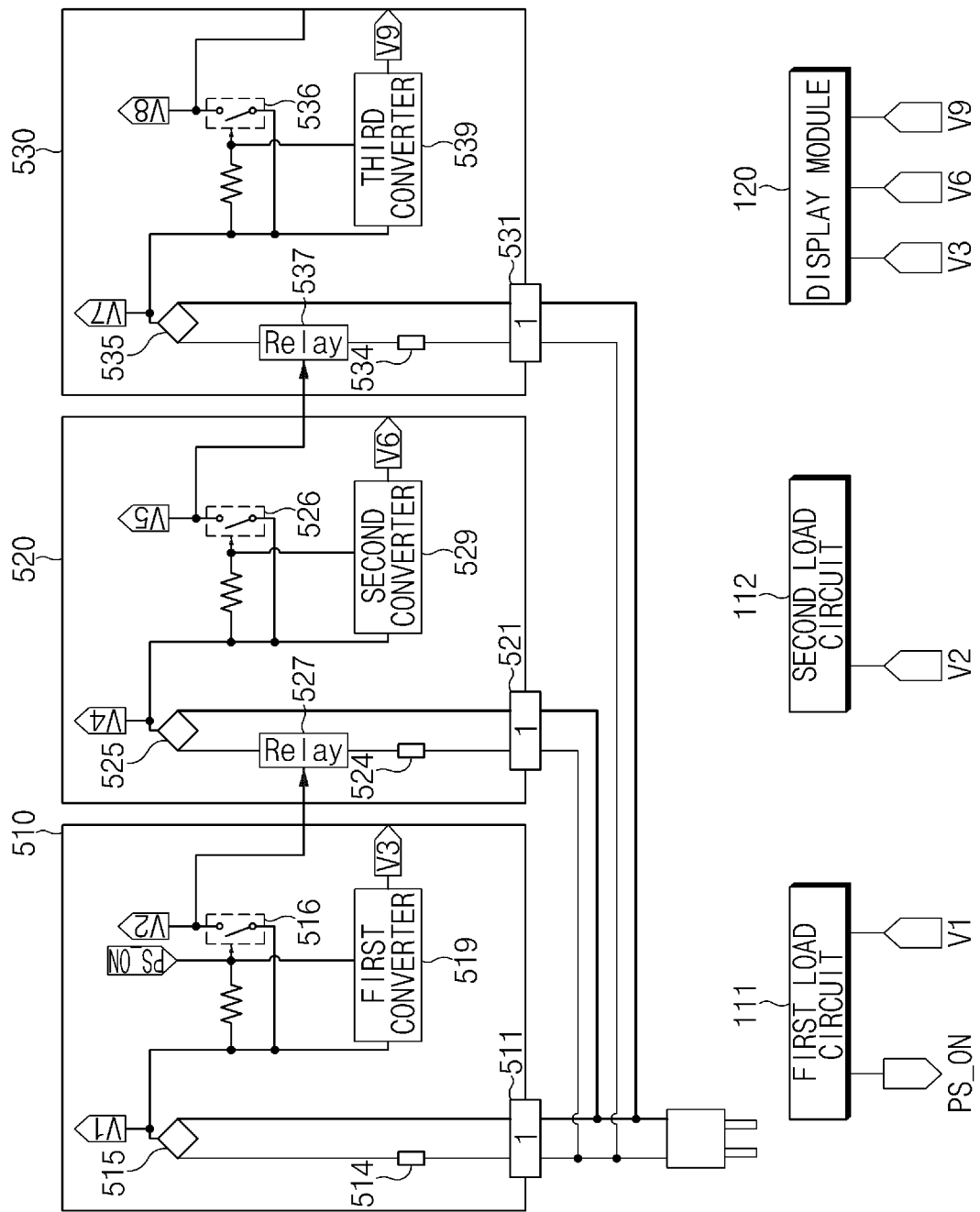
FIG. 4 illustrates another example of a plurality of power modules connected in parallel to an external power supply according to an embodiment.

FIG. 4 illustrates another example of a plurality of power modules connected in parallel to an external power supply, according to an embodiment.

Referring to FIG. 4, a plurality of power modules 510, 520, and 530 may include the first power module 510, the second power module 520, and the third power module 530. According to an embodiment, some components may be omitted or additional components may be further included. According to an embodiment, some of components may be combined into one object, and functions of the components before combination may be performed in the same way.

According to an embodiment, the first power module 510 may include a first interface 511, a first switch 516, a first conversion circuit 515, and a first converter 519. When a first specified signal is received, the first power module 510 may generate a first voltage and, when a second specified signal is received, generate the first voltage V1, a second voltage V2, and a third voltage V3. The first voltage V1 may be supplied to a first load circuit (e.g., 111 of FIG. 1A), and the second voltage V2 may be supplied to a second load circuit (e.g., 112 of FIG. 1A), and the third voltage V3 may be supplied to a display module (e.g., 120 of FIG. 1A).

The first interface 511 may receive AC power from an external power supply. The first interface 511 may be connected to an input terminal of the first conversion circuit 515 via an AC fuse 514.

The first specified signal or the second specified signal may be applied to a control terminal of the first switch 516. When the first specified signal is received in the control terminal of the first switch 516, the first switch 516 may be opened. On the other hand, when the second specified signal PS_ON is received in the control terminal of the first switch 516, the first switch 516 may be activated to form a path for sharing the first voltage. For example, when the second specified signal is received in the control terminal of the first switch 516, the first switch 516 may be activated and the first voltage may be output via the first switch 516. In the disclosure, for convenience of description, the first voltage passed through the first switch 516 is referred to as the second voltage. The second voltage may be supplied to a control terminal of a first relay 527 of the second power module 520.

The first conversion circuit 515 may receive the AC power from the external power supply via the AC fuse 514 and generate the first voltage V1 (DC voltage), the second voltage V2 (DC voltage), and the third voltage V3 (DC voltage) using the received AC power (e.g., digital conversion). The first conversion circuit 515 may include a switching mode power supply (SMPS).

The first converter 519 may receive an output voltage (the first voltage) of the conversion circuit 515 and output the third voltage by converting (e.g., boosting) the first voltage to a specified level. The first converter 519 is an example of a conversion circuit acting on an input DC voltage to produce a specified output DC voltage. For example, when the second specified signal of a high level is applied to a control terminal of the first converter 519, the first converter 519 may be activated and generate the third voltage by converting the first voltage to a specified level. The third voltage may be supplied to a display module (e.g., 120 of FIG. 1A). On the other hand, when the first specified signal of a low level is applied to the control terminal of the first converter 519, the first converter 519 may be deactivated.

According to an embodiment, the second power module 520 may include a second interface 521, a second switch 526, the first relay 527, a second conversion circuit 525 and a second converter 529. When the first relay 527 is opened, the second power module 520 may be deactivated and when the first relay 527 is activated, the second power module 520 may be activated and generate the fourth voltage V4 (DC voltage), the fifth voltage V5 (DC voltage), and the sixth voltage V6 (DC voltage).

The second interface 521 may receive AC power from an external power supply. The second interface 521 may be connected to a first terminal of the first relay 527 via an AC fuse 524.

The second conversion circuit 525 may receive the AC power from the external power supply via the first relay 527, and generate the fourth voltage V4 (DC voltage), the fifth voltage V5 (DC voltage), and the sixth voltage V6 (DC voltage) using the received AC power (e.g., digital conversion). The second conversion circuit 525 may include a switching mode power supply (SMPS).

A control terminal of the second switch 526 is pulled up by the fourth voltage. Therefore, when the fourth voltage is supplied, a signal of a high level may be applied to the control terminal of the second switch 526. When the signal of a high level is applied to the control terminal of the second switch 526, the second switch 526 may be activated to form a path for sharing the third voltage. For example, when the fourth voltage is supplied, the second switch 526 may be activated and the fourth voltage may be output via the second switch 526. In the disclosure, for convenience of description, the fourth voltage passed through the second switch 526 is referred to as the fifth voltage. The fifth voltage may be supplied to a control terminal of a second relay 537.

When a current corresponding to the fifth voltage is applied to the control terminal of the first relay 527, the first relay 527 may be activated, and the AC power received through the second interface 521 may be transferred to the second conversion circuit 525. For example, the first relay 527 may include a coil and a switch. When the fourth voltage is supplied to the coil of the first relay 527, a first terminal and a second terminal of the switch of the first relay 527 are activated, and the AC power received in the first relay 527 through the second interface 521 may be transferred to the second conversion circuit 525.

The second converter 529 may receive an output voltage (the fourth voltage) of the conversion circuit 525 and output the sixth voltage by converting (e.g., boosting) the fourth voltage to a specified level. The second converter 529 is an example of a conversion circuit acting on an input DC voltage to produce a specified output DC voltage. The second converter 529 may be activated or deactivated by the fourth voltage. When the fourth voltage is applied to a control terminal of the second converter 529, the second converter 529 may be activated and generate the sixth voltage by converting the fourth voltage to a specified level. The sixth voltage may be supplied to a display module (e.g., 120 of FIG. 1A). On the other hand, when the fourth voltage is not applied to the control terminal of the second converter 529, the second converter 529 may be deactivated.

According to an embodiment, the third power module 530 may include a third interface 531, a third conversion circuit 535, a third switch 536, the second relay 537, and a third converter 539. When the second relay 537 is opened, the third power module 530 may be deactivated, and when the second relay 537 is activated, the third power module 530 may be activated and generate the seventh voltage V7, the eighth voltage V8, and the ninth voltage V9.

The third interface 531 may receive AC power from an external power supply. The third interface 531 may be connected to a first terminal of the second relay 537 via an AC fuse 534.

The third conversion circuit 535 may receive the AC power from the external power supply via the second relay 537 and generate the seventh voltage V7 (DC voltage), the eighth voltage V8 (DC voltage), and the ninth voltage V9 (DC voltage using the received AC power (e.g., digital conversion). The third conversion circuit 535 may include a switching mode power supply (SMPS).

A control terminal of the third switch 536 is pulled up by the seventh voltage. Therefore, when the seventh voltage is supplied, a signal of a high level may be applied to the control terminal of the third switch 536. When the signal of a high level is applied to the control terminal of the third switch 536, the third switch 536 may be activated to form a path for sharing the seventh voltage. For example, when the seventh voltage is supplied, the third switch 536 may be activated and the seventh voltage may be output via the third switch 536. In the disclosure, for convenience of description, the seventh voltage passed through the third switch 536 is referred to as the eighth voltage. When another power module (not illustrated) is connected to the third power module 530, the eighth voltage may be supplied to a control terminal of a relay of the another power module via the third switch 536.

When the fifth voltage is supplied to a control terminal of the second relay 537, the second relay 537 may be activated, and the AC power received through the third interface 531 may be transferred to the third conversion circuit 535. For example, the second relay 537 may include a coil and a switch. When the fifth voltage is supplied to the coil of the second relay 537, a first terminal and a second terminal of the switch of the second relay 537 are activated, and the AC power received through the third interface 531 may be transferred to the third conversion circuit 535.

The third converter 539 may receive an output voltage (the seventh voltage) of the conversion circuit 535 and output the ninth voltage by converting (e.g., boosting) the seventh voltage to a specified level. The third converter 539 is an example of a conversion circuit acting on an input DC voltage to produce a specified output DC voltage. The third converter 539 may be activated or deactivated by the seventh voltage. When the seventh voltage is applied to a control terminal of the third converter 539, the third converter 539 may be activated and generate the ninth voltage by converting the seventh voltage to a specified level. The ninth voltage may be supplied to a display module (e.g., 120 of FIG. 1A). On the other hand, when the seventh voltage is not applied to the control terminal of the third converter 539, the third converter 539 may be deactivated.

According to the above-described embodiments, input terminals of the plurality of power modules 510, 520, and 530 may be connected in parallel to the external power supply, preventing overload to the input terminals.

Figure 5:
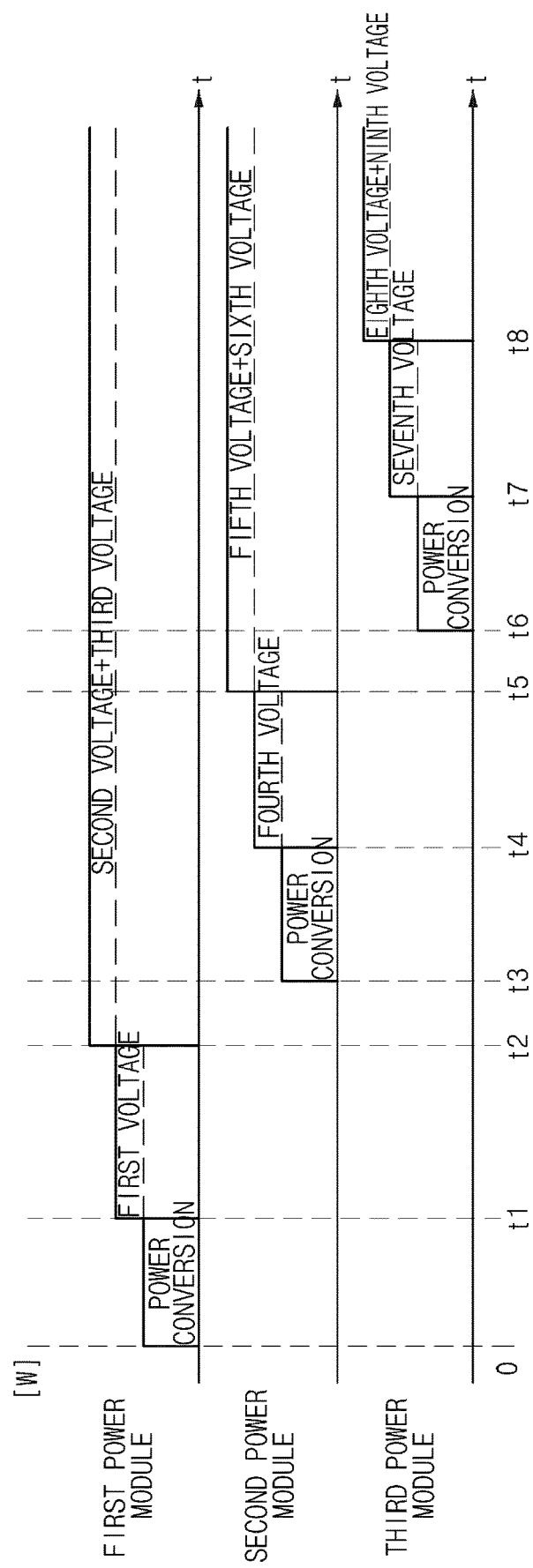
FIG. 5 illustrates a graph of power consumption of a plurality of power modules (e.g., 410, 420, and 430 in FIG. 3) according to an embodiment.

FIG. 5 illustrates a graph for power activities of a plurality of power modules (e.g., 410, 420, and 430 in FIG. 3) according to an embodiment. The ordinate, or y-axis, represents schematically, occurrence of a labelled activity. The abscissa, or x-axis, represents time.

Referring to FIG. 5, before time point t1, the first power module 410 may receive AC power from an external power supply and perform rectification, digital conversion, level-down conversion, or the like on the received AC power.

During a period of time points t1 to t2, when the first power module 410 receives the first specified signal, the first power module 410 may output the first voltage generated as a result of conversion, by the conversion circuit 415, of the received AC power. The first voltage may be used to drive a first load circuit (e.g., 111 of FIG. 1A) of a main module (e.g., 110 of FIG. 1A). The first load circuit 111 may include a circuit for initializing a display device (e.g., 100 of FIG. 1A).

When the first power module 410 receives a second specified signal at time point t2, the first switching element 416 and the first relay 417 are activated during a period of time points t2 to t3, and therefore, the first power module 410 may output the AC power, received through the second interface 412, via the third interface 413. The AC power output through the third interface 413 may be supplied to the second power module 420 through the fourth interface 421.

From time point t2, the first power module 410 may further generate the second voltage and the third voltage using the AC power from the external power supply (e.g., digital conversion) and output the first voltage, the second voltage, and the third voltage. In this case, the second voltage may be supplied to the second load circuit 112, and the third voltage may be transferred to the display module 120. A period of from t1 to t2 may correspond to a time interval needed for the first switch 416 to be activated due to reception of the second specified signal, and for the first converter 419 to be activated. In some embodiments, the third voltage is generated based on the first voltage output by the conversion circuit 415.

At time point t3, the second power module 420 may receive the AC power from the external power supply via the first power module 410 and, during a period of time points t3 to t4, perform rectification, digital conversion, level-down conversion, or the like on the received AC power.

During a period of time points t4 to t5, the second power module 420 may generate the fourth voltage by converting the received AC power. From time point t5, the second power module 420 may further generate the fifth voltage and the sixth voltage using the AC power from the external power supply (e.g., digital conversion) and output the fourth voltage, the fifth voltage, and the sixth voltage. In this case, the third voltage and the sixth voltage may be transferred to the display module 120. A period of from t4 to t5 may correspond to a time interval needed for the second switch 426 to be activated due to output of the fourth voltage and for the second converter 429 to be activated.

When the fourth voltage is supplied to a control terminal of the second switch 426 during a period of time points t5 to t6, the second switch 426 and the second relay 427 are activated and therefore, the AC power, received through the fifth interface 422, may be output through the sixth interface 423. The AC power output through the sixth interface 423 may be supplied to the third power module 430 through the seventh interface 431.

During a period of time points t6 to t7, the third power module 430 may receive the AC power from the external power supply via the second power module 420 and perform rectification, digital conversion, level-down conversion, or the like on the received AC power.

During a period of time points t7 to t8, the third power module 430 may generate a seventh voltage by converting the received AC power.

After the time point t8, the third power module 430 may further generate an eighth voltage and a ninth voltage using the AC power from the external power supply (e.g., digital conversion) and output the seventh voltage, the eighth voltage and the ninth voltage. The period of from t7 to t8 may correspond to a time interval needed for the third switch 436 to be activated due to output of the seventh voltage and for the third converter 439 to be activated. In some embodiments, the ninth voltage is generated by operation of the third converter 439 on a DC output of the conversion circuit 435.

According to the above-described embodiments, the plurality of power modules are sequentially activated and therefore, possibility of occurrence of AC inrush current at the time of initialization of the display device 100 may be reduced.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and internal memory. Also, the one or more instructions may contain a code made by a compiler or a code executable by an interpreter. A module or a program module according to various embodiments may include at least one of the above components, or a part of the above components may be omitted, or additional other components may be further included.

Operations performed by a module, a program module, or other components according to various embodiments may be executed sequentially, in parallel, repeatedly, or in a heuristic method. In addition, some operations may be executed in different sequences or may be omitted. Alternatively, other operations may be added. The embodiments disclosed herein are proposed for description and understanding of the disclosed technology and do not limit the scope of the disclosure. Accordingly, the scope of the disclosure should be interpreted as including all changes or various embodiments based on the technical spirit of the disclosure.

According to the embodiments of the disclosure, it is possible to reduce standby power in the case of implementing a large capability power module using a plurality of small power modules. In addition, various effects understood directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:
    a load circuit configured to output a predetermined signal in response to a user input,
    a first power module configured to receive AC power from an external power supply; and
    a second power module configured to receive the AC power via the first power module,
    wherein the first power module comprises:
        a first conversion circuit configured to output a first voltage for driving the load circuit by performing a first conversion on the received AC power,
        a first switch configured to be activated when the predetermined signal is received and to transfer the first voltage, and
        a first relay configured to be activated when the first voltage is received from the first switch and to form a path for transferring the received AC power to the second power module.

2. The display device of claim 1, wherein the first power module and the second power module are configured to have a same rating.

3. The display device of claim 1, further comprising a display module,
    wherein the first power module is further configured to output a second voltage by performing a second conversion on an output of the first conversion circuit when the predetermined signal is received,
    wherein the second power module is further configured to generate, when the AC power is received via the first relay, a third voltage by performing a third conversion on the received AC power, and
    wherein the second voltage is configured to be used as a first driving voltage for the display module and the third voltage is configured to be used as a second driving voltage for the display module.

4. The display device of claim 3, further comprising a processor configured to be initialized when the predetermined signal is received and to control the display module.

5. The display device of claim 1, wherein the first power module comprises:
    a first interface configured to receive the AC power from the external power supply;
    a second interface electrically connected to the external power supply and a first terminal of the first relay; and
    a third interface electrically connected to a second terminal of the first relay,
    wherein the first power module is further configured to transfer the AC power, received through the second interface, to the third interface via the first relay.

6. The display device of claim 1, wherein the second power module comprises:
    a second conversion circuit configured to output, when the AC power is received via the first relay, a fourth voltage by performing a fourth conversion on the received AC power;
    a second switch configured to be activated when the fourth voltage is supplied and to second switch and to transfer the fourth voltage; and
    a second relay configured to be activated when the fourth voltage is received from the second switch and to form a path for transferring the AC power received via the first.

7. The display device of claim 6, wherein the second power module comprises:
    a fourth interface connected to the first relay of the first power module;
    a fifth interface connected in parallel to an interface of the first power module to which the AC power is input, wherein the fifth interface is electrically connected to the external power supply and a first terminal of the second relay; and
    a sixth interface electrically connected to a second terminal of the second relay,
    wherein the second power module is further configured to transfer the AC power, received from the external power supply through the fifth interface to the sixth interface via the second relay.

8. The display device of claim 7, further comprising:
    a third power module configured to receive the AC power via the second relay.

9. The display device of claim 8, wherein the third power module comprises:
    a third conversion circuit configured to output, when the AC power is received via the second relay, a fifth voltage by performing a fifth conversion on the received AC power;
    a third switch configured to be activated when the fifth voltage is supplied and to transfer the fifth voltage; and
    a third relay configured to be activated when the fifth voltage is received from the third switch and to form a path for transferring the AC power, received via the second relay, to another power module.

10. A display device comprising:
    a load circuit configured to output a predetermined signal when a user input in received;
    a first power module configured to receive AC power from an external power supply; and a second power module configured to receive the AC power from the external power supply, wherein the first power module comprises:
- a first conversion circuit configured to output a first voltage for driving the load circuit by performing a first conversion on the received AC power, and
- a first switch configured to be activated when the predetermined signal is received and to transfer the first voltage, and wherein the second power module comprises:
- a first relay configured to be activated when the first voltage is received from the first switch and to form a first path for receiving the AC power from the external power supply,
- a second conversion circuit configured to output, when the AC power is received via the first relay, a second voltage by performing a second conversion on the received AC power, and
- a second switch configured to be activated when the second voltage is supplied and to transfer the second voltage.

11. The display device of claim 10, wherein the first power module and the second power module are configured to have a same rating.

12. The display device of claim 10, further comprising:
a display module,
wherein the first power module is further configured to output a third voltage by performing a third conversion on an output of the first conversion circuit when the predetermined signal is received,
wherein the second power module is further configured to output, when the AC power is received via the first relay, a fourth voltage by performing a fourth conversion on the received AC power, and
wherein the third voltage is configured to be used as a driving voltage for the display module and the fourth voltage is configured to be used as a driving voltage for the display module.

13. The display device of claim 12, further comprising:
a processor configured to be initialized when the predetermined signal is received and to control the display module.

14. The display device of claim 10, wherein a first input terminal of the first power module and a second input terminal of the second power module are connected in parallel to each other, and
wherein the first power module includes a first interface to receive a first external power and the second power module includes a second interface configured to receive a second external power.

15. The display device of claim 10, further comprising a third power module, wherein the third power module comprises:
- a second relay configured to be activated when the second voltage is received from the second switch and to form a second path configured to receive AC power from the external power;
- a third conversion circuit configured to output, when the AC power is received via the second relay, a fifth voltage by performing a fifth conversion on the received AC power; and
- a switch configured to: i) be activated when the fifth voltage is supplied and ii) transfer the fifth voltage.

16. A display device comprising:
a first power module, configured to be coupled to an external power source, wherein the first power module comprises a first converter;
a second power module coupled to the first power module, wherein the first power module comprises a second converter;
a third power module coupled to the second power module, wherein the third power module comprises a third converter; and
a display module, wherein
a first interface of the display module is configured to receive a first voltage from the first converter,
a second interface of the display module is configured to receive a second voltage from the second converter, and
a third interface of the display is configured to receive a third voltage from the third converter.

17. The display device of claim 16, wherein the first power module is further configured to deliver the first voltage to the display module earlier in time than the second power module is configured to deliver the second voltage to the display module.

18. The display device of claim 17, wherein the second power module is further configured to deliver the second voltage to the display module earlier in time than the third power module is configured to deliver the third voltage to the display module.

19. The display device of claim 17, wherein a delivery of the first voltage to the display module earlier in time than the second voltage is further configured to reduce an inrush current when the display device is turned on.

20. The display device of claim 16, wherein a delivery of a standby voltage to the display module and a lack of a delivery of the second voltage to the display module is further configured to reduce a standby power consumption of the display device when the display device is not turned on.

* * * * *